H. A. WARD.
ANTISKIDDING DEVICE.
APPLICATION FILED OCT. 31, 1919.
1,414,238.
Patented Apr. 25, 1922.
2 SHEETS—SHEET 2.
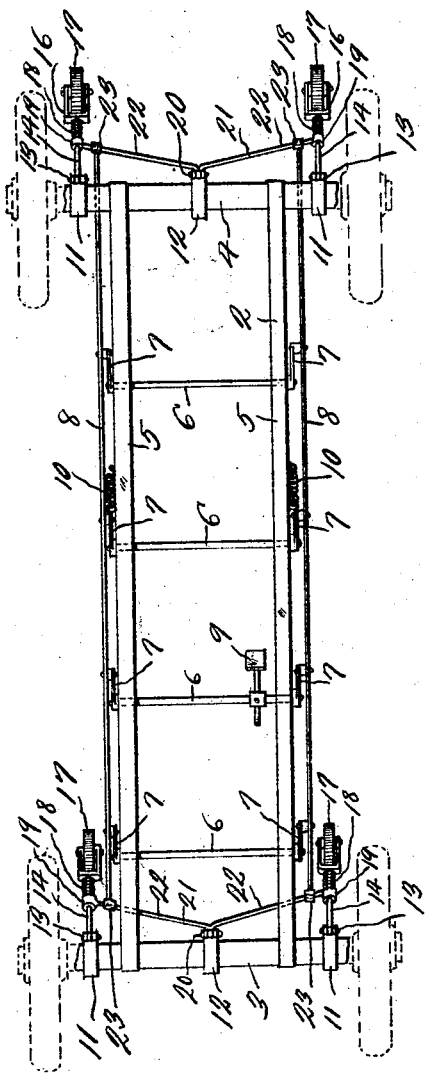
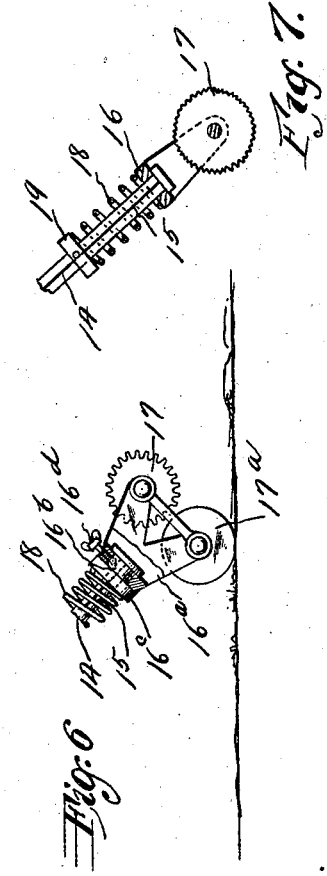
Inventor
Henry A. Ward
By D. Swift
Attorney

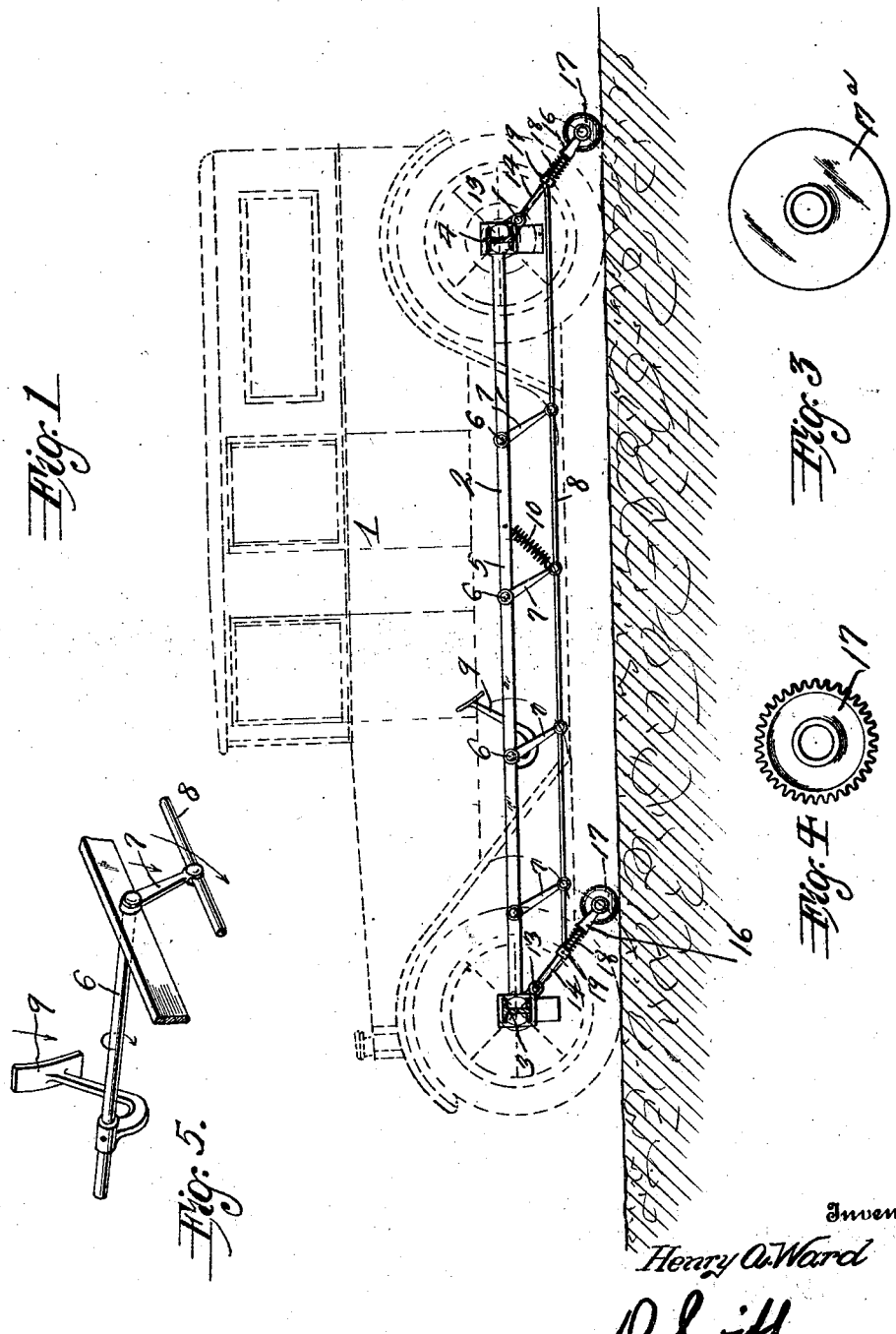

UNITED STATES PATENT OFFICE.

HENRY A. WARD, OF TRENTON, MISSOURI.

ANTISKIDDING DEVICE.

1,414,238. Specification of Letters Patent. Patented Apr. 25, 1922.

Application filed October 31, 1919. Serial No. 334,659.

*To all whom it may concern:*

Be it known that I, HENRY A. WARD, a citizen of the United States, residing at Trenton, in the county of Grundy, State of Missouri, have invented a new and useful Antiskidding Device; and I do hereby declare the following to be a full, clear, and exact description of the invention, such as will enable others skilled in the art to which it appertains to make and use the same.

The invention relates to antiskidding devices for motor driven vehicles and has for its object to provide pivoted arms pivoted to each side of the front and rear axles, the lower ends of said arms being provided with resiliently supported wheels adapted to be forced into engagement with the ground during the skidding of the vehicle. The pivoted arms being simultaneously moved into and out of engagement with the ground by a foot pedal located within the vehicle body, said foot pedal being adapted to rock a transversely disposed shaft having arms pivoted to longitudinally disposed bars which bars are in turn pivoted at its ends to the pivoted arms carried by the axles. Also to provide spring means whereby the wheels which engage the ground will be raised simultaneously from engagement with the ground when pressure is relieved from the pedal.

A further object is to provide yokes in which the ground engaging wheels are pivoted, said yokes being slidably mounted on the lower ends of the pivoted arms carried by the axles thereby allowing a resilient engagement with the ground and also allowing for the irregularities of the ground so that the wheels will all come into contact with the ground.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a motor driven vehicle showing the antiskidding device applied thereto.

Figure 2 is a top plan view of the vehicle frame and device applied thereto.

Figure 3 is a side elevation of one of ground engaging wheels.

Figure 4 is a side elevation of another form of ground engaging wheel wherein a serrated edge is used for gripping the ground.

Figure 5 is a perspective view of a portion of one of the rockable shafts and the foot engaging lever carried thereby.

Figure 6 is a detail view of another form of ground engaging element wherein either the toothed edge wheel or the wheel without the teeth may be used.

Figure 7 is a detail sectional view of the lower end of one of the downwardly extending pivoted arms.

Referring to the drawings, the numeral 1 designates a conventional form of motor driven vehicle and 2 the frame thereof, said frame having at its ends axles 3 and 4. Rockably mounted in bearings of the side rails 5 of the frame 2 are transversely disposed shafts 6, which shafts are spaced from each other. The ends of the shafts 6 have secured thereto downwardly extending arms 7 and pivotally secured to the ends of said arms are longitudinally extending connecting bars 8 which bars when one of the shafts 6 on which a foot pedal 9 is rotated the bars will work and be moved downwardly in unison with each other and in parallel relation to each other. However the bars 8 are normally held in their up position by means of coil springs 10, one end of each spring being connected to one of the arms 7 while the other ends of the springs are connected to the side rails 5 of the vehicle frame. Secured to the front and rear axles in any suitable manner are collars 11 and 12, the collars 11 being preferably adjacent the wheels and the collars 12 centrally of the axle. Pivoted as at 13 to the collars 11 are rearwardly and downwardly extending arms or brackets 14. The lower ends of the arms 14 being provided with squared portions 15 on which are slidably mounted U-shaped brackets 16 which carry ground engaging wheels 17, there being a spring 18 disposed between the upper end of the U-shaped bracket and collar 19 secured to the arms 14. Pivoted to the brackets 12 as at 20 are braces 21, which braces comprise outwardly extending arms 22, the outer ends of which are preferably integrally joined to the collars 19. The arms 22 form braces for preventing the inward or outward movement or twisting of the pivoted arms or brackets 14 when the wheels 17 are in engagement with the ground for preventing the transverse skidding of the vehicle. The ends of the bars 8 are pivotally connected to the brace arms 22 as at 23 so that all of the wheels 17 may be simultaneously forced into engagement with the ground the springs 18 allowing all of the wheels to engage the ground even though the surface thereof is uneven.

Referring to Figure 6 in which a modified form of ground engaging element is shown, it will be seen that in this form a toothed wheel 17 and a wheel 17$^a$ which is not provided with teeth are rotatably mounted in the U-shaped bracket 16$^a$, said U-shaped bracket being pivotally mounted on the reduced portion 16$^b$ of a bushing 16$^c$, which bushing has slidably mounted therein the lower squared portion 15 of the arm 14, there being a set screw 16$^d$ for holding the U-shaped bracket 16$^a$ in position so that the wheel 17 or 17$^a$ will engage with the ground. By providing the two wheels and providing means whereby one or the other may be shifted into position for use, it will be seen that the toothed wheel may be used for extremely slippery streets or for suburban or country use, there being laws in some States preventing the use of wheels which will mark the surface of the streets.

From the above it will be seen that an antiskidding device is provided for motor driven vehicles wherein ground engaging elements may be easily and quickly forced into engagement with the ground adjacent each wheel of the vehicle, thereby preventing skidding of the vehicle. It will also be seen that by the provision of the springs 18 that the U-shaped brackets which carry the wheels will be allowed to move upwardly against the action of the springs 18 thereby allowing the engagement of all of the wheels with the ground even though the surface of the ground is uneven.

The invention having been set forth what is claimed as new and useful is:—

1. An antiskidding device for motor driven vehicles comprising downwardly and rearwardly extending arms pivoted to the front and rear axle of the vehicle adjacent the wheels thereof, ground engaging wheels carried by the lower ends of said arms, braces extending between the arms of the front and rear axles, said braces being pivoted to their respective axle, longitudinally disposed bars connecting the braces of the front and rear axles and disposed on each side of the vehicle frame, transversely disposed rock shafts rockable in bearings of the frame, the ends of said rock shafts being provided with arms having their lower ends pivotally connected to the longitudinally disposed bars, means for rocking one of said transversely disposed shafts for forcing the ground engaging wheels into engagement with the ground and spring means for moving the longitudinally disposed bars longitudinally for raising the wheels from the ground.

2. An antiskidding device for motor driven vehicles, said device comprising arms pivoted to the front and rear axles of the vehicle, braces carried by said arms and extending inwardly and being pivoted to their respective axles, said pivoted arms extending downwardly and rearwardly and having their lower ends provided with ground engaging wheels, said ground engaging wheels being carried by brackets slidably mounted on the lower ends of the arm, springs carried by the arms and against the action of which the wheel brackets act, longitudinally disposed links having their ends pivotally connected to the pivoted arms of each axle on their respective sides of the vehicle, transversely disposed rock shafts carried by the frame and having downwardly extending arms pivoted to the longitudinally disposed bars, means for rocking one of the transversely disposed shafts for pivoting the ground engaging elements downwardly and spring means for raising the ground engaging elements as desired.

3. An antiskidding device for automobiles, said device comprising downwardly and rearwardly extending brackets pivoted to the front and rear axles thereof and adjacent the wheels of each axle, brace members extending upwardly and inwardly from said brackets and pivotally connected to the axles substantially centrally thereof and in longitudinal alignment, connecting rods connecting said downwardly and rearwardly extending brackets at each side of the automobile, a plurality of rockable shafts transversely disposed and rockable in bearings of the frame, downwardly and rearwardly extending arms carried by the ends of said transversely disposed shafts and connected to the connecting rods, springs connected to the ends of oppositely disposed arms carried by one of the transversely disposed shafts and having their other ends connected to the frame, wheels carried by the lower ends of the brackets pivoted to the axles and means for rocking one of the shafts for causing a downward movement of the axle carried pivoted bracket.

4. An antiskidding device for motor driven vehicles comprising a pivoted arm pivoted to the vehicle axle and adapted to be forced in engagement with the ground, a bracket slidably mounted on the lower end of the pivoted arm, ground engaging elements carried by said bracket, a sleeve carried by said pivoted arm, said bracket being rotatably mounted on said sleeve, means for securing said bracket in any position to which it may have been rotated, said sleeve being slidably mounted on a squared portion of the pivoted arm, a collar carried by the pivoted arm, a coiled spring surrounding the arm and interposed between the sleeve and said collar carried by the pivoted arm, the rotatable mounting of the sleeve allowing either ground engaging element to be placed in position for engagement with the ground.

In testimony whereof I have signed my name to this specification in the presence of two subscribing witnesses.

HENRY A. WARD.

Witnesses:
H. W. HENDRICKSON,
MERLE SHEUMAKER.